United States Patent [19]

Lussi et al.

[11] 4,420,351

[45] Dec. 13, 1983

[54] METHOD OF MAKING DECORATIVE LAMINATED PRODUCTS SUCH AS TILES, PANELS OR WEBS FROM CELLULOSIC MATERIALS

[75] Inventors: Eduard Lussi; Ulf L. Ahlstedt; Sven A. Ryden, all of Ronneby, Sweden

[73] Assignee: Tarkett AB, Ronneby, Sweden

[21] Appl. No.: 373,165

[22] Filed: Apr. 29, 1982

[51] Int. Cl.$^3$ .................. B32B 31/12; B32B 31/20; B32B 31/26

[52] U.S. Cl. .................. 156/62.4; 156/62.2; 156/254; 156/265; 156/283; 156/309.6; 156/311; 156/295; 264/112; 264/119; 264/120; 264/122; 264/124; 264/126; 428/140; 428/151; 428/243; 428/249; 428/326; 428/455; 428/514; 428/534; 428/535

[58] Field of Search .................. 156/62.2, 62.4, 196, 156/254, 245, 283, 309.6, 311, 295, 265; 428/106, 140, 151, 243, 249, 326, 455, 534, 535, 514; 264/112, 119, 120, 122, 124, 126

[56] References Cited

U.S. PATENT DOCUMENTS

| | | | |
|---|---|---|---|
| 2,097,089 | 10/1937 | Munroe | 428/243 |
| 2,155,429 | 4/1939 | Levin | 264/112 |
| 2,480,851 | 9/1949 | Goss | 264/120 |
| 2,823,420 | 2/1958 | Heiges et al. | 264/126 |
| 3,308,009 | 3/1967 | Baumgartner | 428/455 |
| 3,549,472 | 12/1970 | King | 428/243 |
| 4,104,103 | 8/1978 | Tarullo | 428/455 |
| 4,225,374 | 9/1980 | Kaufman | 264/119 |
| 4,290,988 | 9/1981 | Nopper | 264/120 |
| 4,347,272 | 8/1982 | Schmidt | 428/455 |

Primary Examiner—Jerome W. Massie

[57] ABSTRACT

A laminated decorative tile particularly for flooring purposes, is made by forming a base layer of granulated cellulosic material in a matrix of fusible plastics, and placing on the base layer a thin decorative layer of cellulosic material with natural holes and recesses therein. After a film of fusible plastic has been applied on the decorative layer the laminate is hot pressed and then immediately cooled in a cold press. The tile obtained has a pleasing appearance because the granules of the base layer have been forced up, in the hot pressing operation, into the holes and recesses of the decorative layer, filling out these holes and recesses. In this embodiment the tile has a smooth wear resisting layer surface but this surface can be provided with a relief pattern such that it conforms to the structure of the decorative layer, if the tile after cooling is heated in a free state, i.e. without press plates.

6 Claims, No Drawings

METHOD OF MAKING DECORATIVE LAMINATED PRODUCTS SUCH AS TILES, PANELS OR WEBS FROM CELLULOSIC MATERIALS

This invention relates to a method of making decorative laminated products in tile, panel or web form.

Decorative coating or covering materials are produced in a multitude of embodiments and may consist for instance of synthetic or natural materials or combinations thereof. The materials may present a smooth or relief wear resisting surface. Mostly, the latter alternative is preferred for both practical and aesthetical reasons. Relief materials have a three-dimensional appearance rich in contrast, but to produce this appearance the pattern and relief must be perfectly synchronized. An ordinary relief embossing to which the plastics surface is subjected and which is not in good register with the printing pattern does not bring about the above-mentioned effect.

Apart from all wood imitations in plastics, excellent cork imitations with relief surfacing have been made during the last few years. Like all pure natural materials, such imitations are usable for both wall covering and flooring purposes. As for coating and covering materials comprising a combination of natural and synthetic materials in the form of a relatively thick plastics sheeting covering the natural material, conditions are slightly different in that these coating and covering materials are only available with a smooth wear resisting surface since one has not succeeded in developing any method of securing a thick wear resisting plastics layer on, for instance, cork without neutralizing the relief effect at the same time.

Such smooth cork flooring tiles, which have been manufactured for a great many years, are composed of a wear resisting layer of plastics, a decorative layer, a resilient layer and a base layer. The wear resisting layer preferably consists of a calendered or coated plastisol of transparent softened PVC of high resistance to wear and stain repellency. The resilient layer consists of a sheet made by lathe-turning or splitting blocks of cork granules. This sheet is, if necessary, refined by prelamination with a thin decorative cork veneer. The base layer serves as a mechanical stress relieving means and said layer or a further layer complementary of the wear resisting layer counteracts dishing of the tiles and delays diffusion of moisture from the sub-floor. For the last-mentioned layer use is made of a softened PVC film which has the same modulus of strength as the wear resisting layer or a higher modulus than said layer. This will result in a balance of forces in the finished floor structure and ensure that the tiles remain planar.

Cork is a material which is excellently suited for the purpose concerned, but its enormous porosity and air content give rise to problems at the tile manufacture. Being a natural product, cork besides suffers from numerous defects which appear as big or small holes and recesses that are not acceptable in the finished tiles. This necessitates a severe selection and implies expensive waste in the production. Especially thin cork veneers of but little compression are usually strewn with holes which must be stopped up before the sheets can be provided with laminates.

The wear resisting layer is usually united with the underlying layers by pressure gluing. One has also tried to manufacture cork webs continuously including varnishing and roll gluing, but these experiments have not met with any great success.

Summarizing, it may be established that natural materials combined with a wear resisting layer of plastics film occur only in the form of cork tiles with a smooth-covering film layer.

The object of the present invention is to permit, by the use of a novel manufacturing method, making both smooth and relief tiles, panels and webs of this type, which are suited both as wall coverings and floorings and which in view of the insignificant waste are cheaper than the products hitherto made.

The object of the invention is realized by granulating a cellulosic material, particularly cork, mixing the granulate with a fusible plastics and making a mat therefrom, cutting from a cellulosic material of the same kind as or another kind than the first mentioned cellulosic material thin slices which in the state obtained with the through holes and recesses therein are placed on the mat thus made, applying a film of fusible plastics on the thin slices of cellulosic material and compressing the laminate thus obtained under supply of heat for melting the plastics and urging the material of the mat into the holes and recesses of the slice, and then cooling the compressed tile.

The most characteristic feature of the method according to the invention is the use of an entirely new type of base layer which consists of granulated cellulosic material in a matrix of fusible plastics. If the cellulosic material is cork and the base layer has a thickness of about 2 mm, the particle size must not exceed 2 mm and is preferably below 1.5 mm. When at the manufacture of the tile, panel or web the thin decorative layer is placed on said base and the layers are subjected to a compressing operation at such a temperature that the plastics cures/melts, the plastic mass with its cork filling will "rise" into and fill out the holes and recesses of the decorative layer, whereby a decorative layer with a smooth surface and perfect appearance is obtained. The filling material can be given any desired nuance, for instance a nuance which more or less conforms with the predominant nuance of the decorative layer or contrasts with said nuance.

The wear resisting layer which normally consists of a precoated 0.5 mm film of softened PVC, is placed on the decorative layer before said layer is united with the base layer, i.e. all three layers are united with each other in the same operation. In the compressing operation the wear resisting layer is thus also molten so that it well adheres to the decorative layer. The wear resisting layer may also consist of a coating material other than a film, such as a plastisol, different kinds of lacquers, polyurethane etc.

After the product has been compressed for a predetermined time it is transferred to a cold press in which it is cooled and simultaneously subjected to a higher pressure, suitably approximately twice as high as that in the hot press. The tile, panel or web which is removed from the cold press, has the above-mentioned advantageous appearance and an entirely smooth wear resisting surface and is usable for wall covering and flooring purposes.

To provide a tile, panel or web with relief surface there is required a natural material having, what may be called, a "memory of its resilience". Cork is such a material. The cork with its peculiar cellular system is compressed when subjected to pressure but once the load has been relieved it partially springs back after some time lag. As the load in the above case is not relieved until the plastics has cooled off, the state of tension of the cork is blocked so that the tile, panel or web obtains the smooth wear resisting layer face. If, however, the tile, panel or web is subjected after cooling to heating in a free state (i.e. without being acted upon by the press plate or like means) to a temperature exceeding the softening temperature of the plastics, the state of tension of the cork relaxes and the cork returns to the shape it had before the pressing operation. If use is made of softened PVC, a reheating temperature of 70°–150° C. is suitable. After reheating the tile, panel or web is allowed to cool, likewise in a free state. By this change of state one obtains a relief wear resisting layer face of very advantageous appearance, since the relief of the wear resisting layer is controlled by the material of the decorative layer, whereby a perfect synchronization of pattern and relief is obtained.

As hinted at in the foregoing, the cork has proved extremely advantageous for the manufacture of a tile of natural material having a relief face, in which the decorative appearance depends upon the structure and composition of the thin layer or veneer employed. The layer is produced by splitting a block of cork conglomerate into thin sheets which display a range of different growth zones of varying relative orientation and compressibility. The different zones posses varying resilience and restorative capacity, whereby the relief formation can vary from simple knottiness to a perfect work of art of nature. Although cork is the most suitable material for the time being, other cellulosic materials are also conceivable, that have or may be given the "memory of resilience" required for the relief formation.

Applying the method according to the present invention, one gains the special advantage that no cellulosic material is wasted, as all waste is converted into granulate. This of course entails savings of cost beyond those obtained because the decorative layer need not be stopped up and there is only an insignificant discard of finished products.

A tile, panel or web manufactured in the above-described manner and having a base layer of granulated cellulosic material in a matrix of fusible plastics, a thin decorative layer on the base layer and a wear resisting layer of a plastic film of fusible plastics, which latter layer by a cold pressing operation after the hot pressing has smooth upper face or by renewed heating in a free state after the cold pressing operation has a relief surface, is highly decorative and extremely advantageous in use because it is both wear resistant and comfortable to walk on owing to its resilience and insulating capacity.

The invention will now be more fully described with reference to an example.

A 1 mm thick cork veneer was placed on a calendered 2 mm base layer of softened PVC and cork granulate having a particle size of up to 1.5 mm, and a 0.5 mm thick wear resisting layer film of softened PVC was then placed on said cork veneer. The material was put into a press mould having distance means and provided on both sides with paper coated with a mould release agent. The pressing operation was performed in a hot press (180° C.) under successively increasing pressure up to 2 kg/cm$^2$ for five minutes. The mould with the material contained therein was then transferred in hot condition to a cold press where the pressure was increased from 2 kg/cm$^2$ to 5 kg/cm$^2$ for five minutes, whereupon the cold product was removed from the mould. The product now was entirely planar, but at the subsequent heating to 130° C. for two minutes a relief pattern was formed on the surface, the appearance of which was determined by the structure used for the cork veneer.

What we claim and desire to secure by Letters Patent is:

1. A method of making decorative laminated products, such as tiles, panels or webs, which comprises the steps of granulating a cellulosic material, mixing the granulate with a fusible plastics and making a mat therefrom, cutting from a cellulosic material thin slices which in the state obtained with the through holes and recesses therein are placed on the mat thus made, applying a film of fusible plastics onthe thin slices of cellulosic material, and compressing the laminate thus obtained under supply of heat for melting the plastics and urging the material of the mat into the holes and recesses of the slice, and then cooling the compressed tile.

2. A method as claimed in claim 1, wherein the cooling step includes cooling of the product in a cold press in which the tile is subjected to a higher pressure than in the hot pressing operation.

3. A method as claimed in claim 1 including the further step of subjecting the tile after cooling to free heating and cooling for relief formation of the plastics film.

4. A method as claimed in claim 1, wherein at least the thin layer of cellulosic material is cork.

5. A method as claimed in claim 1, wherein at least the granulated natural material is wood.

6. A method as claimed in claim 1, wherein the plastics are softened PVC.

* * * * *